(12) United States Patent
Romeres

(10) Patent No.: US 7,183,916 B2
(45) Date of Patent: Feb. 27, 2007

(54) METHOD FOR IDENTIFYING PACKAGES IN TRANSIT

(75) Inventor: Giuseppe Romeres, Padua (IT)

(73) Assignee: EDS-Te.Ma S.R.L., Marghera (IT)

( * ) Notice: Subject to any disclaimer, the term of this patent is extended or adjusted under 35 U.S.C. 154(b) by 99 days.

(21) Appl. No.: 10/489,259

(22) PCT Filed: Sep. 6, 2002

(86) PCT No.: PCT/IT02/00573

§ 371 (c)(1),
(2), (4) Date: Aug. 26, 2004

(87) PCT Pub. No.: WO03/022683

PCT Pub. Date: Mar. 20, 2003

(65) Prior Publication Data

US 2004/0263333 A1 Dec. 30, 2004

(30) Foreign Application Priority Data

Sep. 11, 2001 (IT) .......................... PD2001A0217

(51) Int. Cl.
*G08B 13/14* (2006.01)
(52) U.S. Cl. .............................. 340/572.1; 340/572.2; 340/572.4
(58) Field of Classification Search ............... None
See application file for complete search history.

(56) References Cited

U.S. PATENT DOCUMENTS

| 6,554,188 | B1* | 4/2003 | Johnson et al. | 235/385 |
| 7,009,517 | B2* | 3/2006 | Wood | 340/572.1 |
| 2005/0198226 | A1* | 9/2005 | DeLia et al. | 709/220 |

* cited by examiner

*Primary Examiner*—Daniel Wu
*Assistant Examiner*—Son Tang
(74) *Attorney, Agent, or Firm*—Browdy and Neimark, PLLC

(57) ABSTRACT

A method for identifying packages in transit, comprises the steps of providing on a support a transponder chip equipped with a memory unit containing data identifying the chip, means for reading the memory unit and means for receiving and transmitting data at radio frequency, affixing said support to one of the packages so as to associate the identification data with the package, and providing one or more remote control units capable of radio frequency communication with the transponder chip so as to receive the identification data and identify the package. The method also comprises the steps of providing, on the support, means for writing the memory units, detecting predefined parameters of the package, transmitting them to the transponder chip by means of the remote control units and entering them into the memory unit by means of the writing means. An identification device designed to operate using the aforementioned method is also described.

16 Claims, 2 Drawing Sheets

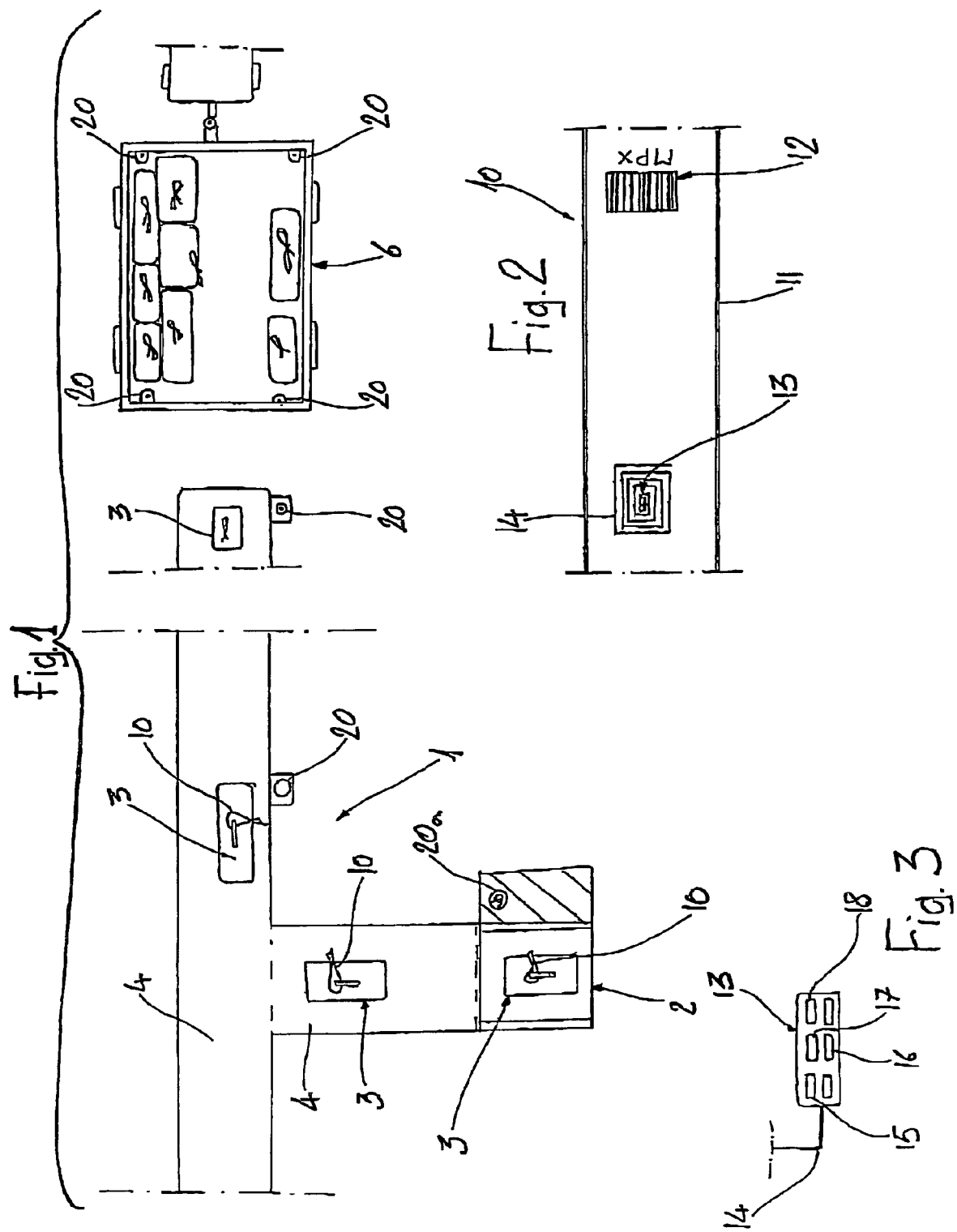

METHOD FOR IDENTIFYING PACKAGES IN TRANSIT

The present invention relates to a method for identifying packages in transit, according to the preamble of the main claim. It also concerns an identification device designed to operate using said method.

The invention has a particular application in the management of airport handling of passenger baggage and postal packages, although it may advantageously used in any type of merchandise transportation system.

In airports, and more generally in merchandise distribution and/or collection sites, it is known to identify each package so as to be able to associate it correctly with the departure and destination location and, if necessary, with a passenger, specific flight, etc. Among other things, said identification serves to define the despatch route and verify the correctness thereof, so as to ensure efficient delivery of the packages sent.

In this context, moreover, an important requirement is to verify, in particular at the destinations, that the packages have not been tampered with in any way during the transit period. This verification, which is particularly important for the purposes of air transport safety, is aimed at preventing the possibility of introducing dangerous objects (for example explosives) into the packages as well as the theft of items contained in said packages.

The methods for identifying packages according to the known art envisage the application, onto each package, of an identification code with which the information necessary for despatch of the package is associated in a specific manner.

A known solution, which is described for example in U.S. Pat. No. 6,222,452, envisages the incorporation in an adhesive label, which is commonly used in applications of this type, of a transponder chip able to transmit via radio frequency its own identification code (contained in a read-only memory unit) to control units especially provided along the package distribution paths, for example along the conveyor belts.

The identification code received by the control units is then sent to a central processing system which, by comparing the code of the transponder chip with the package data stored in its own memory, controls and manages the merchandise loading/unloading operations. This central system, moreover, by communicating over a network with similar processing systems provided in the other airports, reconstructs and verifies the package despatch route.

In the solution proposed by the cited known art there is obviously therefore the need for an external processing system as well as a local and inter-airport computer network, this however resulting in several drawbacks associated with the delicate and complex management of the overall data processing system.

As is known, in order to increase security checks, an increasingly greater number of airports are being equipped with radiographic control stations aimed at checking the contents of the baggage by means of the emission of electromagnetic waves and specifically by means of the emission of X-rays. In particular, more recently in some countries, it has become compulsory to introduce radiographic control stations for all the baggage which must be stored in the hold of an aircraft.

These stations conventionally envisage the use of special telecameras which send to the operators equipped with a video terminal the X-ray images of the baggage, allowing them to check its contents.

At present there is no possibility of checking automatically whether baggage has or has not passed through a radiographic control station, while it is obvious that it is particularly important to be able to establish that the baggage has passed through the abovementioned radiographic control stations.

Therefore, there exists the—not just theoretical—possibility that baggage may be removed upstream of the radiographic control station and then reintroduced downstream of the said station without there being any type of alarm able to prevent this type of operation.

The problem forming the basis of the present invention is that of providing a method for identifying packages in transit which is functionally designed to overcome the limitations described above with reference to the cited known art.

Within the context of this problem a primary object of the invention is to provide a method which allows efficient management of the merchandise loading/unloading operations and simultaneous verification of possible tampering therewith.

This problem is solved and this object is achieved by the present invention in the form of an identification method provided in accordance with the claims which follow.

The characteristic features and advantages of the invention will emerge more clearly from the detailed description of a preferred example of embodiment thereof, illustrated by way of a non-limiting example with reference to the accompanying drawings in which:

FIG. 1 is a schematic plan view of a station for receiving, recording and loading packages, operating in accordance with the method of the present invention;

FIG. 2 is a partial schematic view of an identification device operating in accordance with the method of the invention;

FIG. 3 is a schematic view, on a larger scale, of a detail of the device according to FIG. 2.

Figure 4:
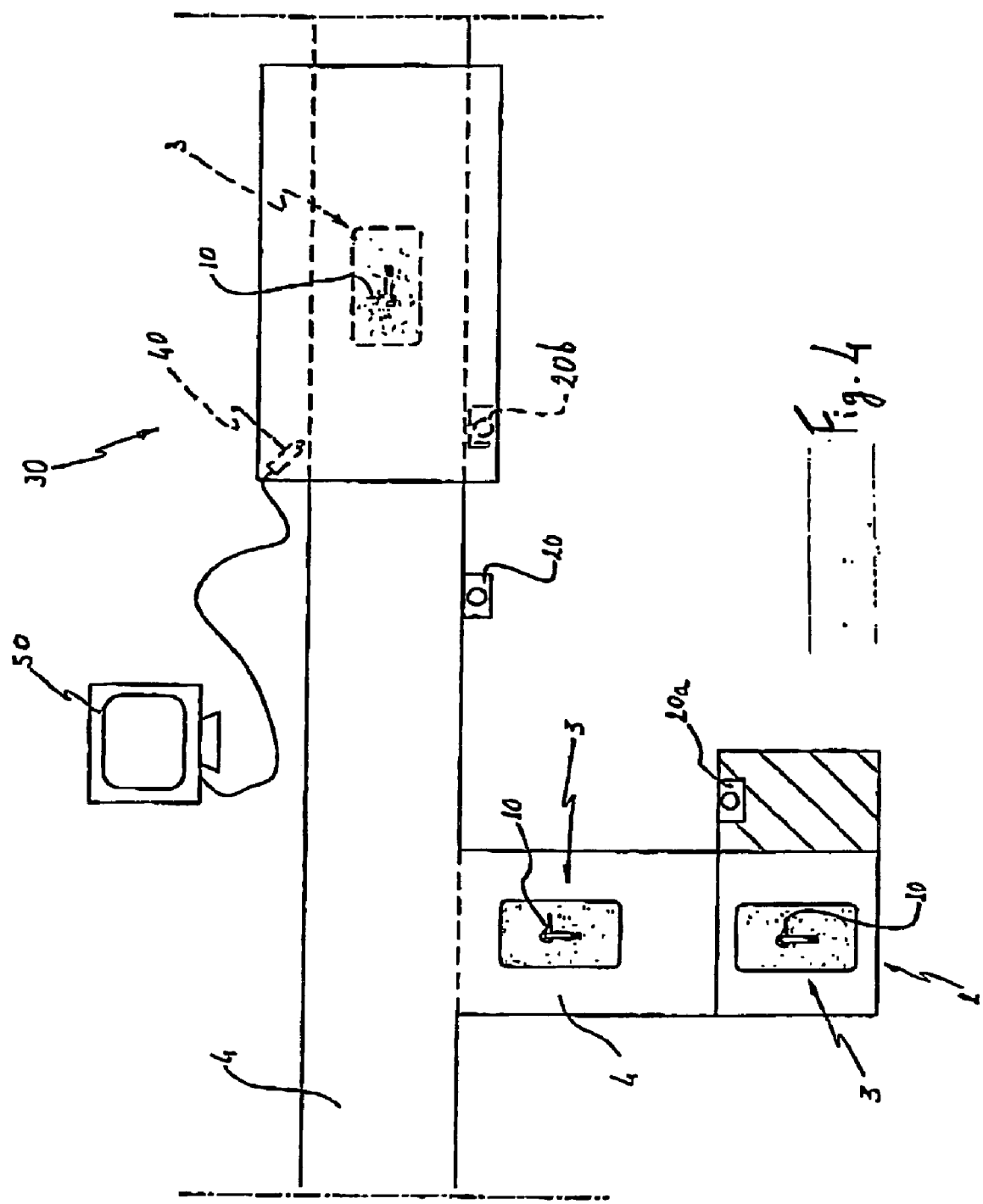
FIG. 4 shows a schematic plan view of a station for receiving, recording and loading packages, operating in accordance with the method of the present invention, together with an associated radiographic control station.

In the figures, 1 denotes overall a station for receiving, recording and loading packages (check-in station) operating in accordance with the method of the present invention.

The station 1 considered in the present example of embodiment is situated in an airport and is designed to receive the baggage of passengers, it being understood, however, that the method described below may be similarly implemented also in connection with other types of transport (ship, railway, etc.) and/or merchandise (postal packages, etc.) in a manner which can be easily adapted by the person skilled in the art.

The station 1 comprises a load sensing unit 2 able to weigh each baggage 3 and transportation means comprising, for example, a series of conveyor belts 4 and a package transport trolley 6, for transferring the baggage 3 from the load sensing unit 2 to the carrier (not shown) intended for transportation thereof.

Each baggage 3 has, affixed to it, an identification device 10 comprising a strip-like support 11 in the form of an adhesive label.

The support 11 contains in a conventional manner, for example directly printed thereon and/or by means of bar codes, information 12 relating to the identity of the passenger who is the owner of the baggage, the airline ten-digit code, the route to be followed, the flight number, etc.

The identification device 10 also comprises a transponder chip 13, which is incorporated in the support 11 and is operationally connected to receiving and transmission means in turn including a spiral-shaped antenna 14. The chip 13 is ideally of the passive type, i.e. it does not have independent power supply means, obtaining the necessary energy for its operation by means of induction on the circuit of the antenna 14 when subject, during inductance, to an external electromagnetic field.

According to a main characteristic feature of the invention, the chip 13 comprises a memory unit 15 of the rewritable type, means for reading and writing thereof, respectively indicated by 16 and 17, and processor means 18 for processing the data contained in the memory unit 15 and for integrated management of the abovementioned reading, writing, receiving and transmitting means.

The transponder chip 13 is therefore operationally capable of communication, via radio frequency, with remote control units 20 which are suitably arranged along the path for transportation of the baggage 3, as will be clarified more fully below, so as to transmit and likewise receive information to/from them.

For this purpose, each control unit 20 is equipped with an antenna (not shown) and is able to transmit at radio frequency when activated by a radio wave generator.

Advantageously the abovementioned transponder chip 13 may be of the type which is marketed by Texas Instruments under the tradename Tag-it HF-I®. This latter product, the known characteristics of which are understood as being incorporated here for reference purposes, is provided on a polymer sheet-like support (for example a sheet of PET) and is provided with a non-volatile EEPROM memory comprising several blocks, each of which can be separately programmed and can undergo reading and writing operations. Moreover, the stored data may be protected from subsequent variations in order to prevent undesirable tampering.

In greater detail, this transponder is provided with a resonant circuit comprising concentric spirals inserted inside the sheet of PET and connected to an electric capacitor formed by two sheets of aluminium joined together. This capacitor, once charged, owing to the effect of sending of electromagnetic signal waves (for example at a frequency of 13.56 MHz) emitted by the remote control unit 20, is able to energize the microchip (processor means 18) of the transponder. Obviously the transponder, being a passive element, is unable to emit data unless it has been interrogated by the remote control unit 20.

The method for identifying the baggage 3 envisages affixing, onto each of them, a respective device 10, after entry in the memory unit 15, via the writing means 17, of data identifying the baggage.

It should be noted, therefore, that the transponder chip 13 also contains, in addition to the identification code of the chip itself, also data such as the identity of the passenger, flight, etc. normally stored by data processing means only in the central processing system.

The baggage 3 is then weighed on the load sensing unit 2 and its weight is transmitted to the transponder chip 13 by a control unit 20a so that this latter parameter is also transcribed in the memory unit 15.

It is also envisaged that the abovementioned identification data may be transmitted to the chip 13 by the control unit 20a at the same time as the parameter relating to the weight of the baggage 3.

The baggage 3 is then moved along the path defined by the conveyor belts 4 where other control units 20 may be conveniently located, said control units, by activating the chip 13 with the electromagnetic field generated by them, being able to receive from said chip the information necessary for verifying correct distribution of the baggage to the corresponding carrier.

Should it be required to transfer the baggage 3 onto the carrier by means of a package transport trolley 6, it is envisaged that a further control unit 20 may be provided on the latter. Said control unit is able to activate the respective transponder chips 13 of the baggage 3, obtaining the identification data necessary for verifying that all the baggage is intended for the same flight and corresponds to the associated passenger list.

For this purpose, the package transport trolley 6 is provided, on one or more of its walls 7, with control units 20 similar to those described further above.

Once the destination has been reached, it is envisaged that the transponder chip 13 of each baggage 3 is activated by and placed in communication with control units similar to those which are provided at the departure location, in order to verify the correctness of the route.

It should be noted that the data necessary for said verification is all contained in the memory unit 15 of the chip 13, avoiding the need to access the network of computer systems provided between the departure airport and arrival airport.

In order to check that there has been no tampering with the merchandise along the transportation path, including during the loading/unloading operations, the baggage 3 is subject cyclically to weighing operations. The data relating to the weight detected is transmitted by means of a control unit to the chip 13 which, by means of the writing means 17, enters it into the memory unit 15. The data relating to the weight of the baggage, as detected during the previous weighing operation, is then compared by the processor means 18. If a difference is detected between the two values which is greater than a predefined threshold (for example 100 grammes—said margin being defined in order to take into account any variations in humidity), the processor means 18 generate an alarm signal which, once transmitted to the control unit, activates the necessary procedures.

It should be noted that, in this case also, the data necessary for verifying that there has been no tampering is all contained in the transponder chip 13.

Advantageously, in accordance with a further feature of the present invention illustrated schematically in FIG. 4, it is envisaged using an additional control unit 20b arranged inside a radiographic control station 30 provided. The latter envisages the use of special telecameras 40 able to send to operators equipped with a video terminal 50 the X-ray images of the baggage, allowing verification of its contents.

Consequently, the method according to the invention envisages recording in the transponder chip 13 the fact that the checking operation has been carried out together with temporal information as to when the operation was performed so that, for example, it is possible to identify later on the operator who at that particular moment checked passing-through of the baggage 3.

As a result it is therefore possible to perform a check downstream of the radiographic control station 30 in order to determine whether baggage has passed through said station 30.

Owing to the presence of the transponder chip 13 it is also possible to associate the telecamera images of the radiographic control station with the corresponding baggage 3, simply by introducing, by way of reference to the images, the code identifying the microchip of the baggage 3.

These images may be memorized and stored on a special hard disk for a sufficiently long period of time.

The same images may then be retrieved at any moment afterwards and in particular in the case where it is required to carry out further checks on: the baggage 3.

In this way, in a similar manner to possible weight comparisons of the baggage 3 it is also possible to perform comparisons of the images, for example upon departure and arrival of the baggage 3 in two different airports.

This latter check may also be performed in an entirely automatic manner by means of special image comparison software which obviously takes into account any displacement of the objects inside the baggage 3 as well as the difference in the images recorded by the telecameras due to the different positions assumed by the baggage 3.

In other words, once the images have been stored in a computer with the possibility of making them available over a network, for example via the Internet or intranet, other organisations or bodies connected to the same network and authorised to make further checks are able to check easily the condition of the baggage 3 for example upon departure and before loading at a transit airport.

The present invention therefore solves the problem posed, offering at the same time numerous other advantages, including safer and simplified management of the packages in transit.

The invention claimed is:

1. Method for identifying packages in transit, comprising the steps of:
   providing on a support a transponder chip equipped with a memory unit containing data identifying said chip, means for reading said memory unit and means for receiving and transmitting data at radio frequency;
   affixing said support to one of said packages so as to associate said identification data with said package;
   providing one or more remote control units capable of radio frequency communication with said transponder chip so as to receive said identification data and identify said package;
   characterized in that it comprises furthermore the steps of:
   providing in said support means for writing said memory unit;
   detecting predefined parameters of said package, transmitting them to said transponder chip by means of said remote control units and entering them into said memory unit by means of said writing means,
   characterized in that it envisages a recording step performed by at least one additional remote control unit provided inside a first radiographic control station and able to record by means of said transponder chip, in said memory, the passing of said package through said radiographic control station.

2. Method according to claim 1, in which said parameters comprise information relating to the route of said package.

3. Method according to claim 1, in which said parameters comprise information relating to the weight of said package.

4. Method according to claim 1, in which said remote control units are provided on package transport trolleys.

5. Method according to claim 1, characterized in that it envisages a checking step downstream of said first radiographic control station, aimed at checking that said package has passed through the said first radiographic control station.

6. Method according to claim 1, characterized in that the transponder chip associated with said package sends, during its passage through said first radiographic control station, its associated identification data to said remote control unit, said data being able to be associated with the images of the package itself recorded in said first radiographic control station.

7. Method according to claim 6, characterized in that it envisages a step involving comparison of the images of said package generated by said first radiographic control station with the images subsequently produced in a second radiographic control station.

8. Method according to claim 7, characterized in that said comparison step is performed automatically using special software.

9. Method for identifying packages in transit, comprising the steps of:
   providing on a support a transponder chip equipped with a memory unit containing data identifying said chip, means for reading said memory unit and means for receiving and transmitting data at radio frequency;
   affixing said support to one of said packages so as to associate said identification data with said package;
   providing one or more remote control units capable of radio frequency communication with said transponder chip so as to receive said identification data and identify said package;
   characterized in that it comprises furthermore the steps of:
   providing in said support means for writing said memory unit;
   detecting predefined parameters of said package, transmitting them to said transponder chip by means of said remote control units and entering them into said memory unit by means of said writing means, in which said parameters entered into said memory unit are compared with corresponding parameters contained therein,
   characterized in that it envisages a recording step performed by at least one additional remote control unit provided inside a first radiographic control station and able to record by means of said transponder chip, in said memory, the passing of said package through said radiographic control station.

10. Method according to claim 9, in which said parameters entered in said memory unit are compared by said chip.

11. Method according to claim 9, in which said parameters entered in said memory unit are compared by a remote station independent of said chip.

12. Method according to claim 9, in which, depending on a difference between said parameters resulting from said comparison, an alarm signal is generated.

13. Method according to claim 9, in which said parameters comprise information relating to the route of said package.

14. Method according to claim 9, in which said parameters comprise information relating to the weight of said package.

15. Method according to claim 9, in which said remote control units are provided on package transport trolleys.

16. Method according to claim 9, characterized in that it envisages a checking step downstream of said first radiographic control station, aimed at checking that said package has passed through the said first radiographic control station.

* * * * *